Oct. 22, 1935.    A. MABRY    2,018,142
WASHBOARD
Filed Sept. 23, 1933
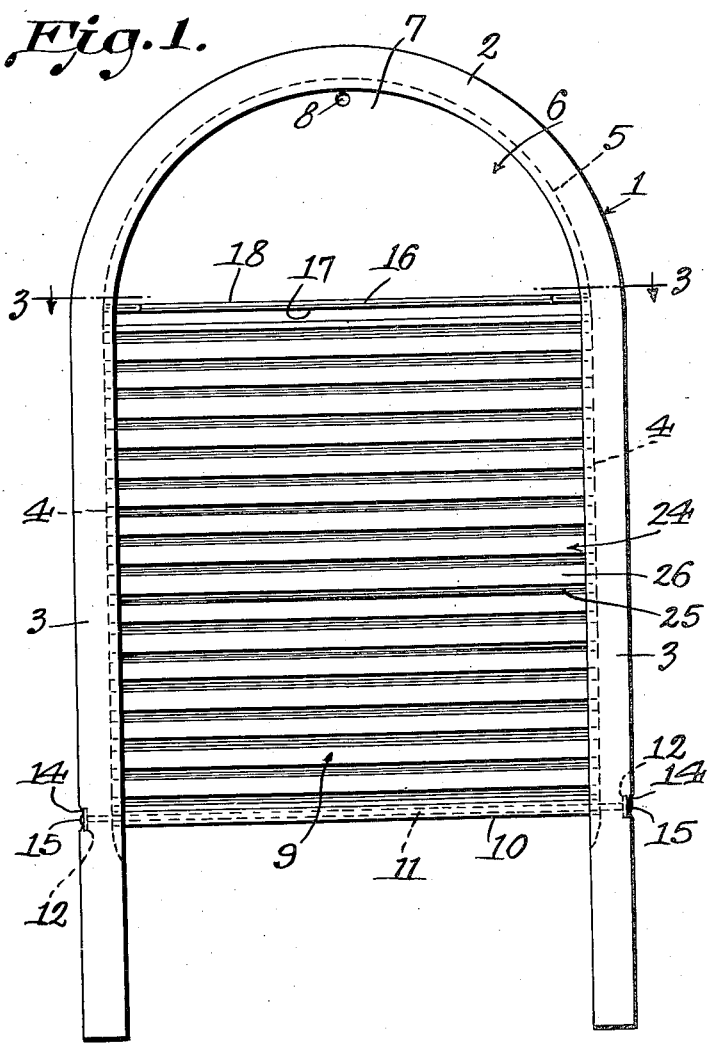
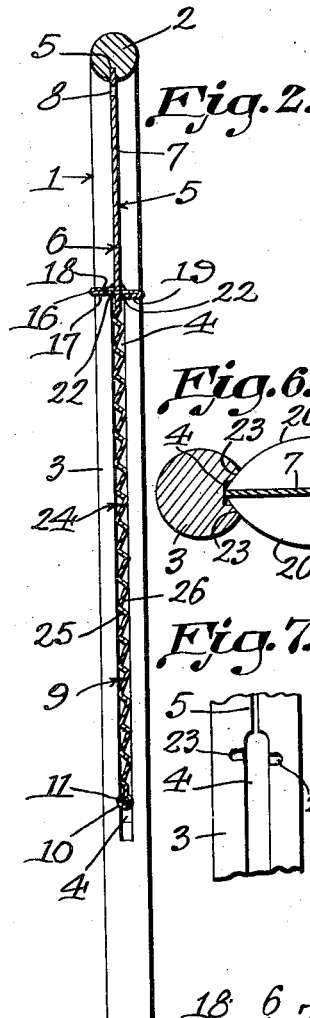
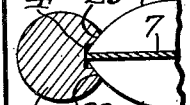
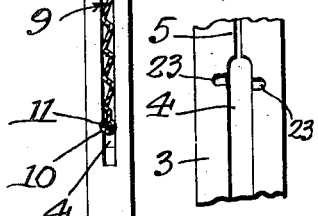
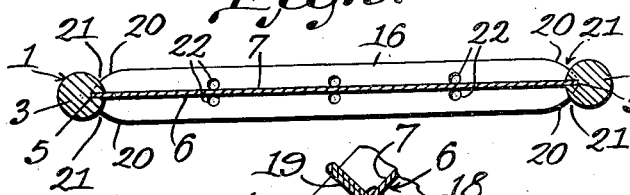
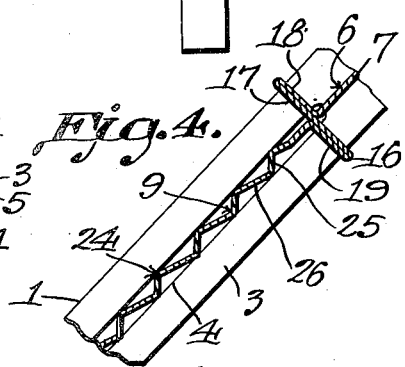
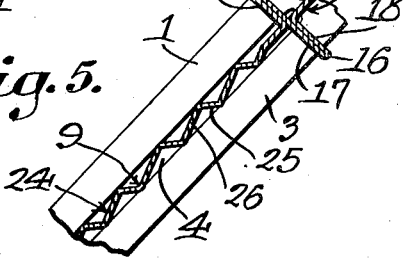
Alfred Mabry Inventor
By C. A. Snow & Co.
Attorneys Patented Oct. 22, 1935

2,018,142

UNITED STATES PATENT OFFICE 2,018,142

WASHBOARD

Alfred Mabry, Lorane, Ga.

Application September 23, 1933, Serial No. 690,719

1 Claim. (Cl. 68—29)

The device forming the subject matter of this application is a washboard. One object of the invention is to provide a novel rubbing member for the washboard. Another object of the invention is to provide novel means for assembling the rub-plate with the frame. A further object of the invention is to improve the soap receptacle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in elevation, a device constructed in accordance with the invention;

Fig. 2 is a longitudinal section;

Fig. 3 is a section on the line 3—3 of Fig. 1;

Fig. 4 is a longitudinal section showing one surface of the rubbing member turned uppermost;

Fig. 5 is a longitudinal section showing the opposite surface of the rubbing board turned uppermost;

Fig. 6 is a fragmental section showing how the rubbing member is assembled with the frame.

Fig. 7 is a fragmental side elevation showing a portion of one of the arms of the washboard frame.

In carrying out the invention, there is provided a frame 1, which is generally made of wood. The upper end of the frame 1 is curved to form a semi-circular bridge 2 and the frame 1 includes parallel side arms 3. In the inner surfaces of the side arms 3 there are longitudinal grooves 4. These grooves 4 terminate short of the lower ends of the arms 3, as shown in Fig. 2. There is a groove 5 in the inner edge of the bridge 2 of the frame 1. At its lower end, the groove 5 in the bridge 2 communicates with the upper ends of the grooves 4 in the side arms 3. The grooves 4 in the side arms 3 are somewhat wider than the groove 5 in the bridge 2.

The body of the board is made of a single piece of metal which cannot rust, and is denoted by the numeral 6. The body 6 comprises a flat upper portion 7, the edge of which is shaped to be received in the groove 5 of the bridge 2. The side edges of the body 6 are received in the grooves 4 of the side arms 3. In the upper portion of the part 7 of the body of the board there is an opening 8, whereby the board may be hung up when not in use.

The body 6 of the device includes a rubbing member 9 provided at its lower end with a transverse cylindrical socket 10, through which extends a securing element 11, preferably a rod, the rod being extended through the side arms 3 of the frame 1. There are washers 12 on the ends of the rod 11, and these washers are received in recesses 14 formed in the outer surfaces of the arms. The ends of the rod or securing element 11 are riveted down as shown at 15, on the washers 12, and thus the frame 1 is held in the U-shaped position shown in Fig. 1 of the drawing, with the body 6 of the board firmly engaged in grooves 4 and 5 of the frame 1.

Where the rubbing member 9 joins the part 2 of the board, there is a transverse shelf or soap holder 16. The soap holder 16 is formed in one-piece with the body 6. It comprises a transverse main portion 17, turned upon itself to form an overlying upper flange 18, and an underlying flange 19, the flanges 18 and 19 being in contact with the main portion 17 of the soap holder 16. The inner edge of the upper flange 18 is joined to the flat portion 7 of the body 6, and the inner edge of the lower flange 19 is joined to the rubbing member 9 of the board. At its ends, the soap holder or shelf 16 has inwardly inclined edges 20. When the frame 1 is clamped on the body 6 of the board, by the action of the rod 11 and the washers 12, the inclined edges 20 indent the wood of the side arms 3 and form seats 23, as shown in Fig. 6, the hold of the frame 1 on the body 6 of the board being enhanced accordingly. Moreover, as shown in Fig. 3, the inclined edges 20 cooperate with the side arms 3 of the frame 1, to form grooves 21, through which the water can run, from the space above the soap holder or shelf 16, on the rubbing member 9 of the board. The water above the shelf or soap holder 16 is laden with soap, to some considerable extent, and it is desirable to have this soap laden water delivered on the rubbing portion of the board. This is done because the grooves 21 are provided, by the edges 20 and the adjacent surfaces of the side arms 3 on the frame 1. In order to facilitate the flow of soap laden water downwardly upon the rubbing portion of the board, the shelf or soap holder 16 is provided with openings 21 extended therethrough, and located closely adjacent to the portion 7 of the board, as shown in Fig. 3.

The rubbing portion or member 9 of the board is supplied with transverse corrugations 24. The corrugations 24 are made of walls 25 and 26, the walls 26 having a less abrupt slant than do the walls 25. Thus when the washboard is in the position of Fig. 5, abrupt shoulders are presented, facilitating the cleaning of the garments when they are especially dirty, or when the material is of a heavy nature. If, however, a lighter rubbing action is desired, then the board is inverted, as shown in Fig. 4.

The inclined edges 20, as a matter of fact, are slightly convexed. Therefore, as shown in Fig. 3, there are no sharp edges or abrupt corners on the soap shelf 16, to tear the garments or hurt the hands of the person doing the rubbing. As shown to good advantage in Figs. 7, 4 and 5, the wider grooves 4 in the side arms 3 extend a little above the seats 23 and the soap shelf 16. The grooves 21 of Fig. 3 are spaced a little way from the part 7 of the body of the board, and if any small amount of soapy water does not find its way down on the rubbing member 9, through the grooves or notches 21 shown in Fig. 3, that part of the soapy water will enter the grooves 4, above the soap shelf 7, and find its way downwardly, through the grooves 4.

Having thus described the invention, what is claimed is:

A washboard comprising a frame including side arms and a bridge connecting the side arms, the inner surfaces of the side arms having parallel-walled grooves, and the inner surface of the bridge having a parallel-walled groove opening at its lower ends into the grooves of the side arms, the grooves of the side arms being wider than the groove of the bridge, a metal body comprising a single layer upper portion, the edge of which is received in and completely fills the groove of the bridge, the body comprising a lower portion having corrugations, the ends of the corrugations being received in the parallel-walled grooves of the side arms, the body being provided with a transverse, soap holding shelf, and a securing device connecting the lower portions of the side arms, each end of the shelf having oppositely disposed converging edges defining pointed extremities on the shelf, and the securing device being short enough to force the pointed extremities of the shelf into the side arms.

ALFRED MABRY.